April 4, 1939.   A. G. ROSE   2,153,483
WRAPPING MACHINE
Filed April 20, 1938   11 Sheets-Sheet 4
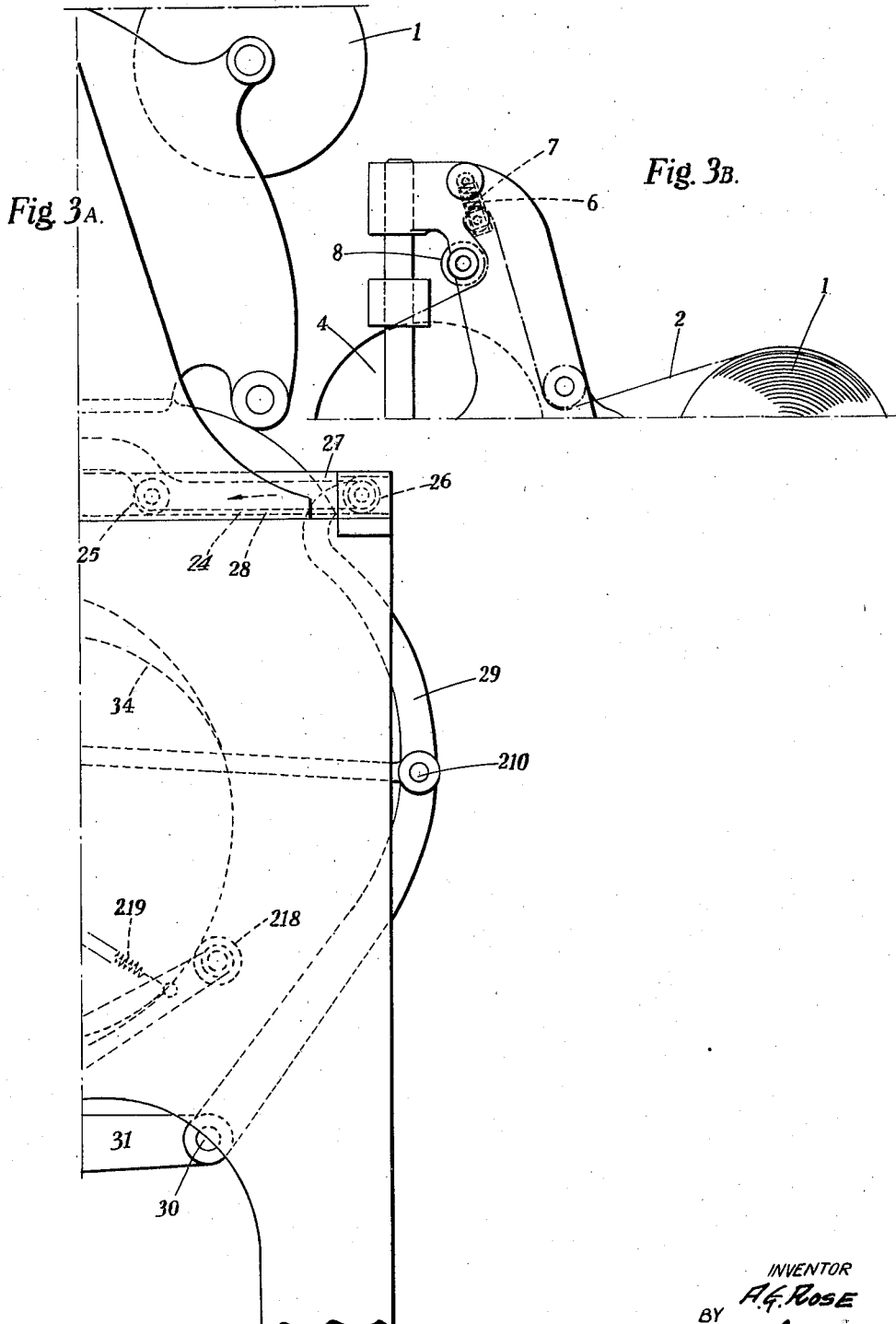
INVENTOR
A. G. ROSE
BY
ATTORNEYS April 4, 1939.  A. G. ROSE  2,153,483
WRAPPING MACHINE
Filed April 20, 1938    11 Sheets-Sheet 5
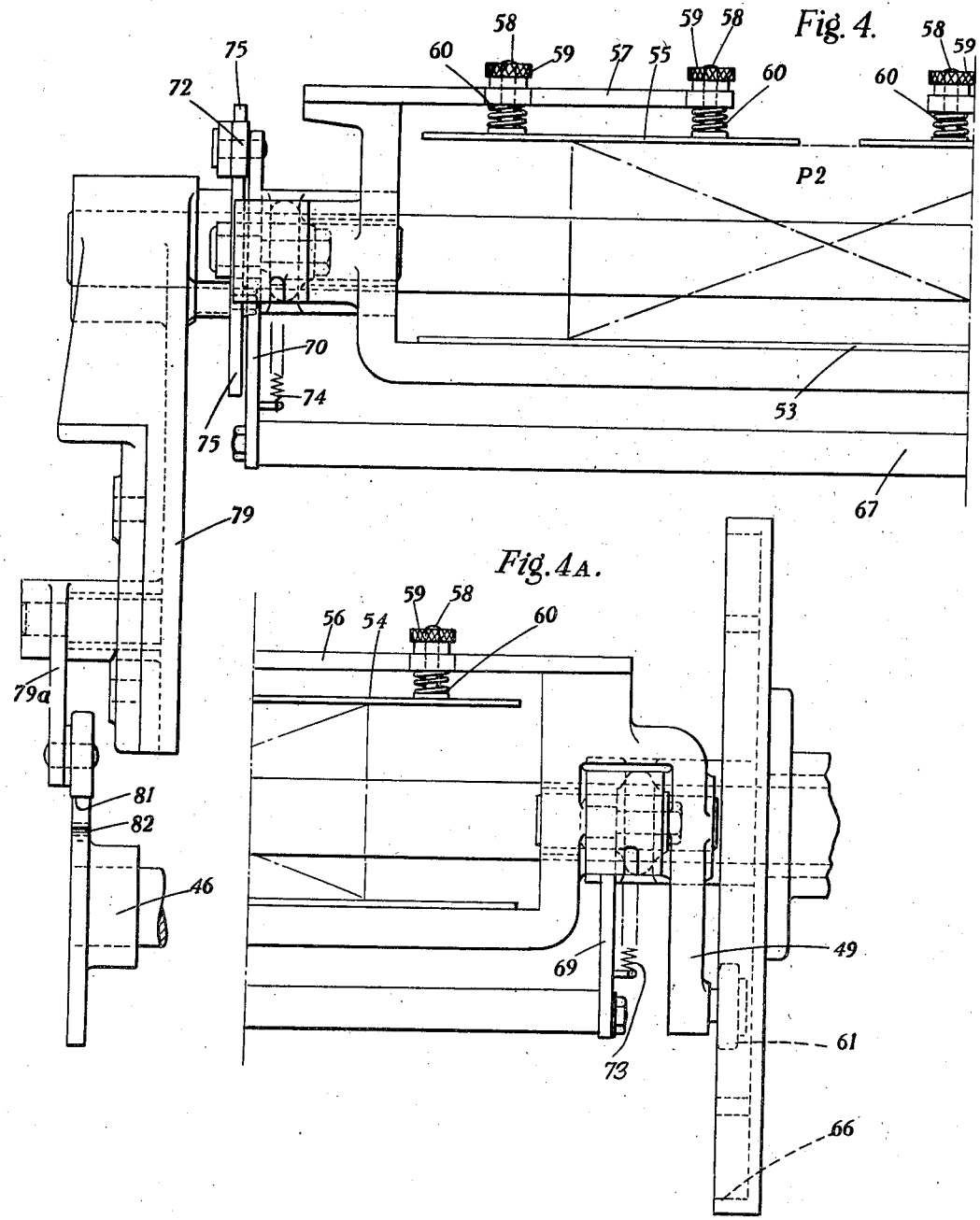
INVENTOR
A.G. Rose
BY
ATTORNEYS

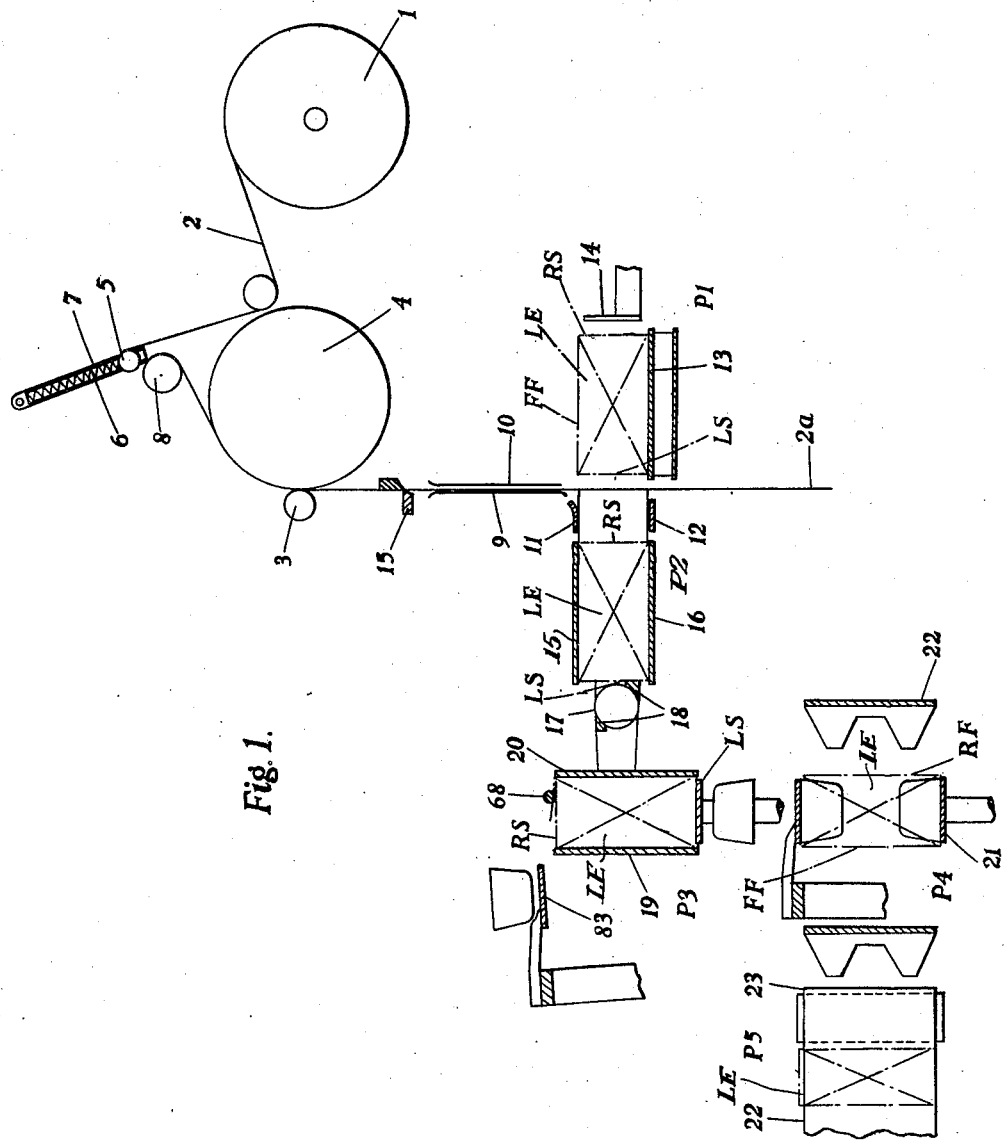
April 4, 1939.   A. G. ROSE   2,153,483
WRAPPING MACHINE
Filed April 20, 1938   11 Sheets-Sheet 1

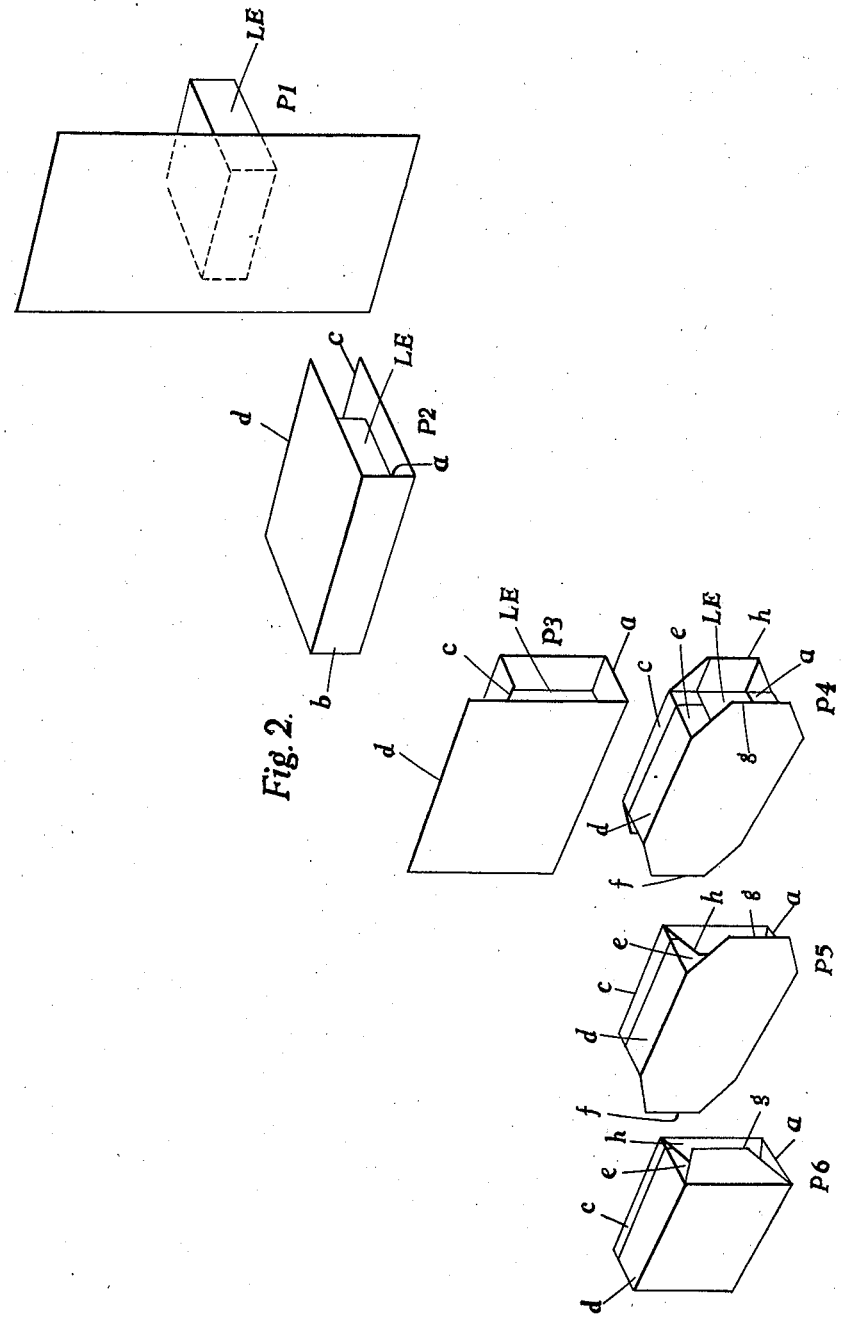

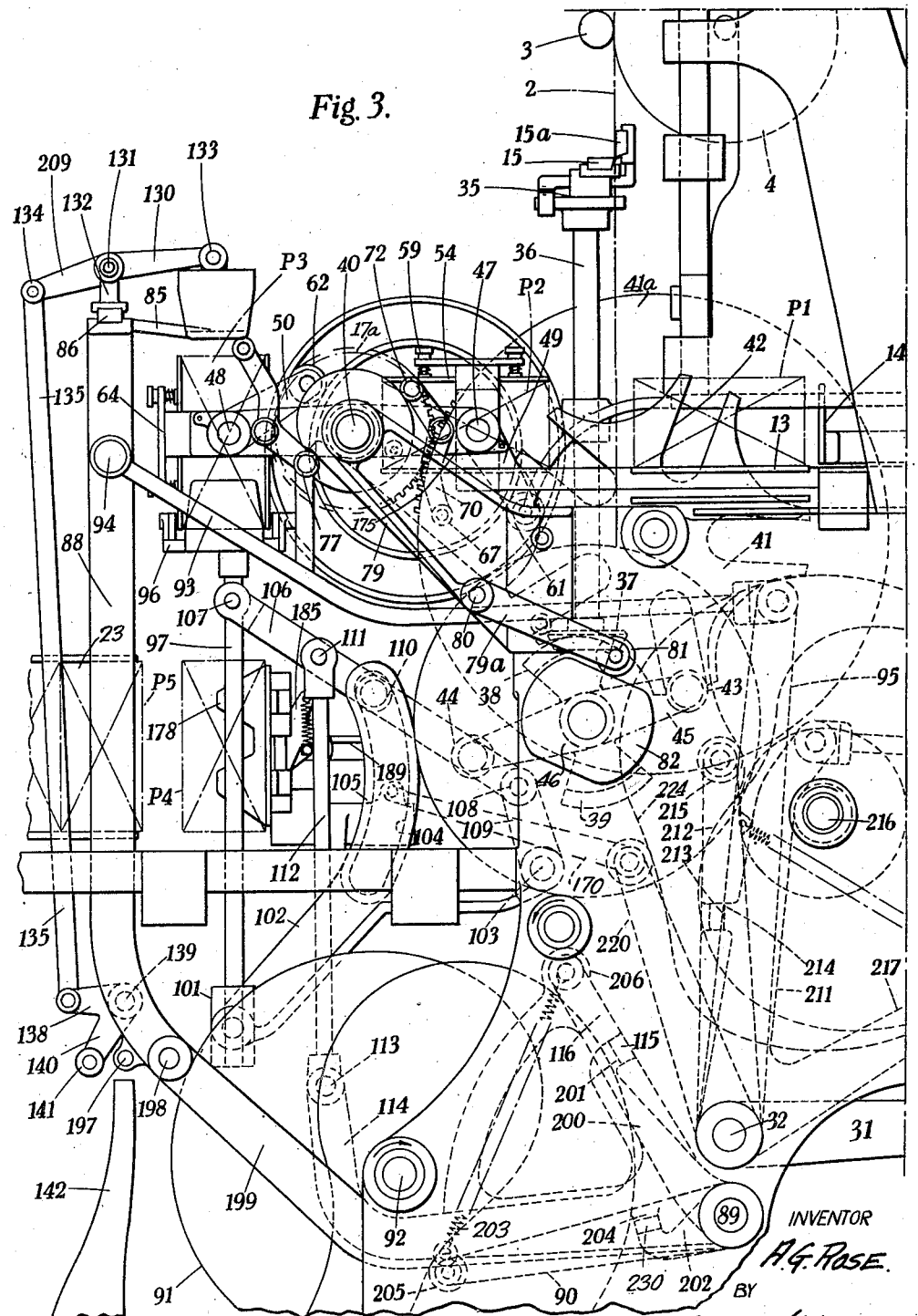

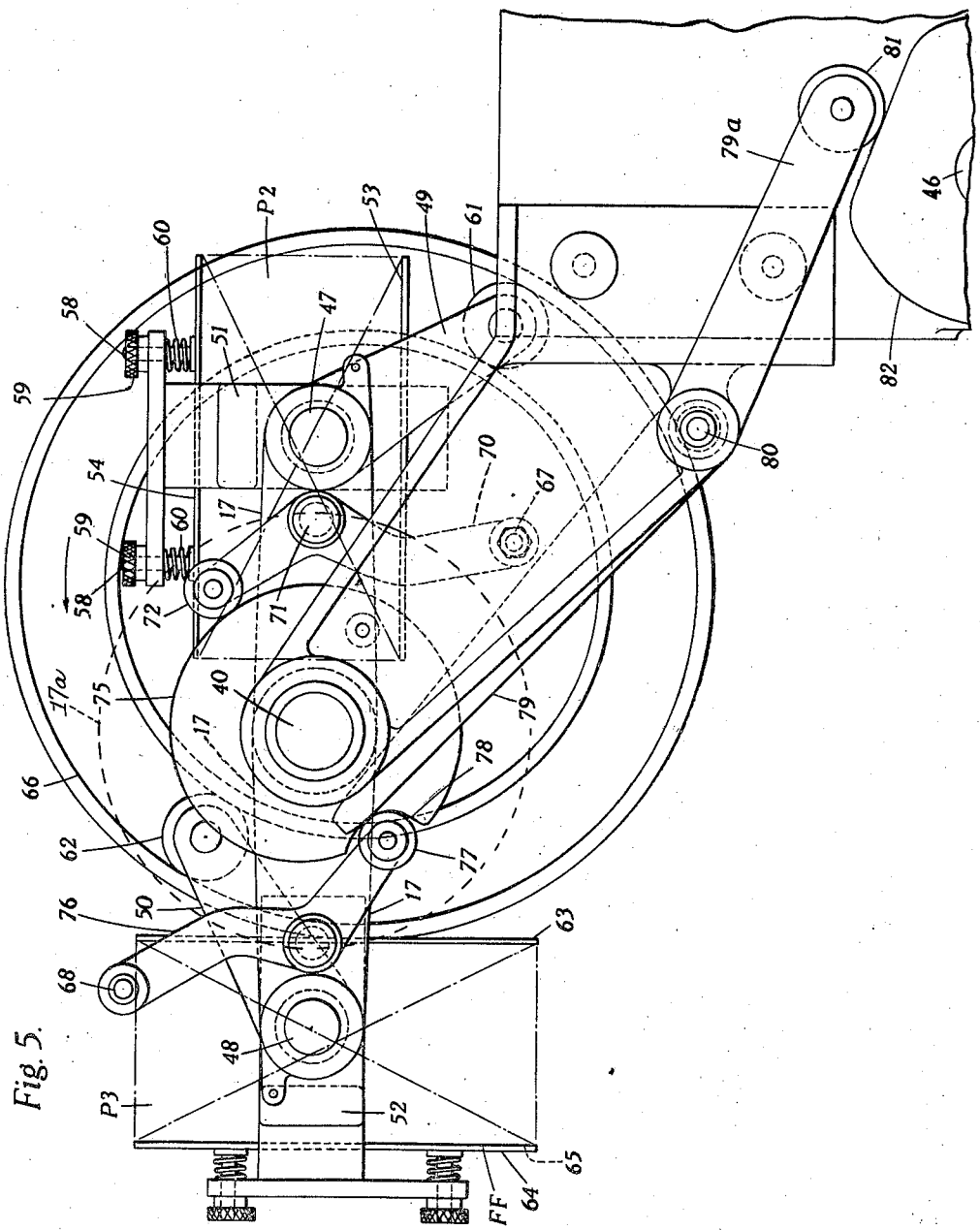

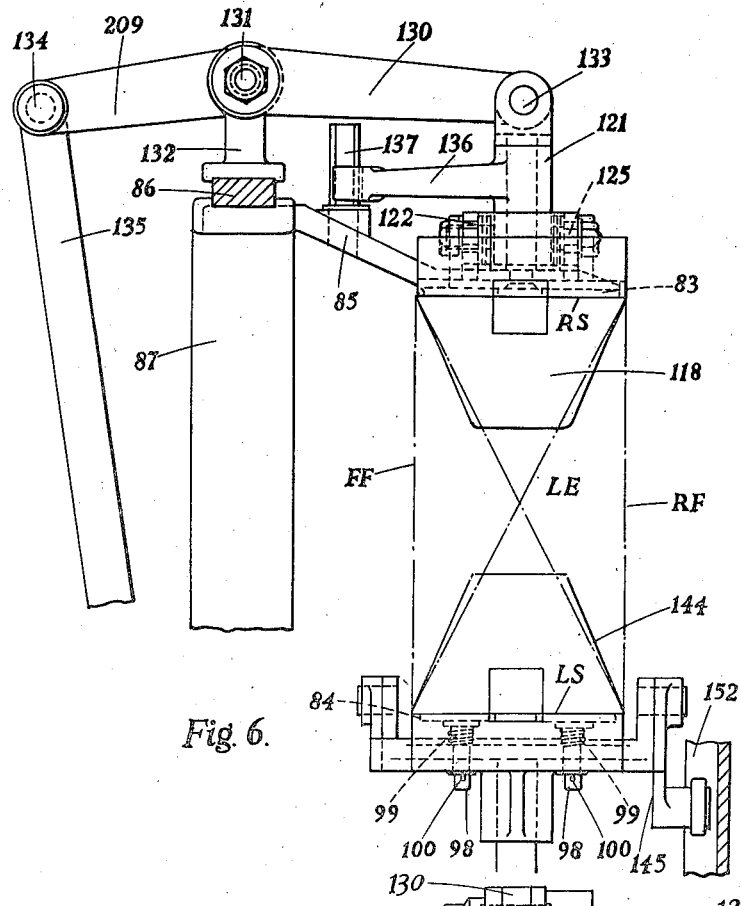

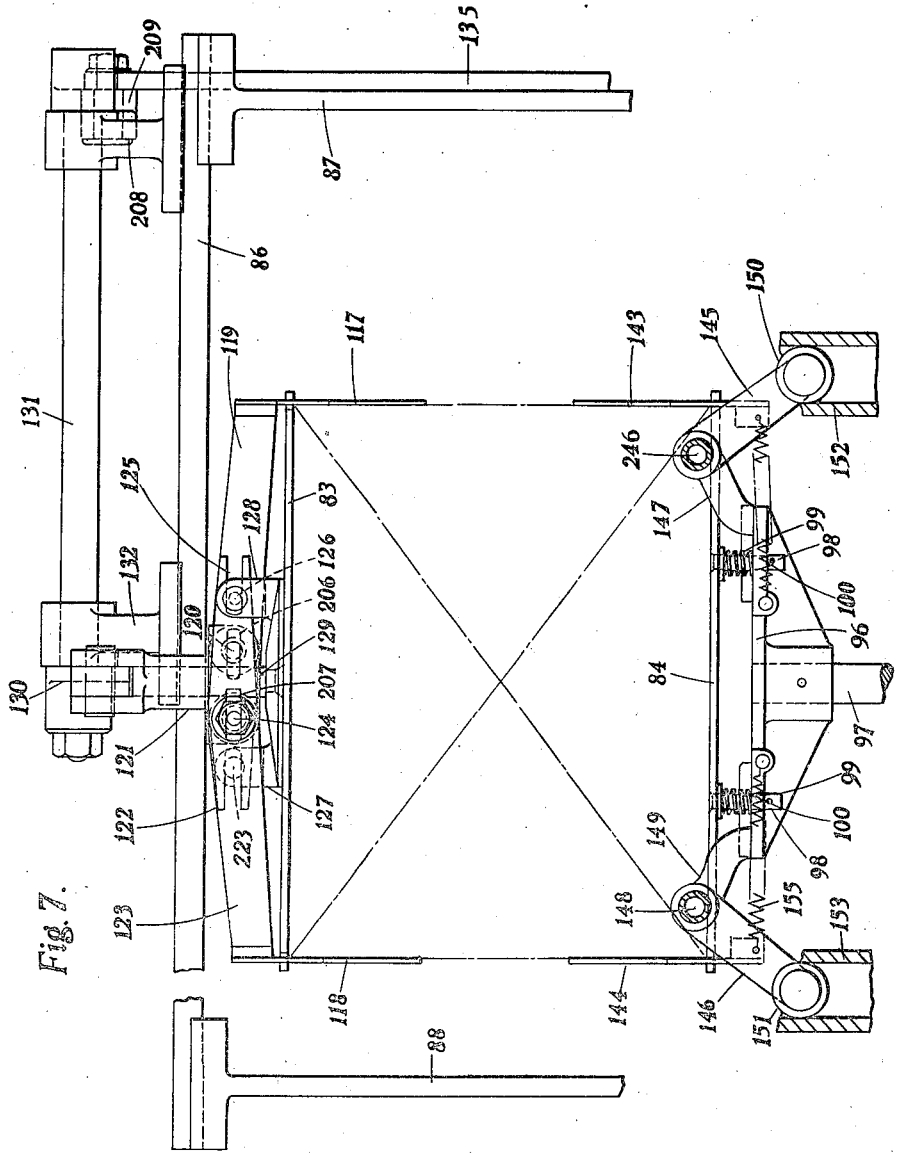

Patented Apr. 4, 1939

2,153,483

UNITED STATES PATENT OFFICE 2,153,483

WRAPPING MACHINE

Alfred German Rose, Gainsborough, England, assignor to Rose Bros. (Gainsborough) Limited, Gainsborough, Lincolnshire, England, a British company Application April 20, 1938, Serial No. 203,180
In Great Britain March 6, 1937

21 Claims. (Cl. 93—2)

The invention relates to the wrapping of articles or containers such as cartons, packets or the like and has for its object to provide improvements in or relating to such wrapping, whereby the wrapping material is applied to the article or container in a tighter manner than is usually possible with wrapping machines. Another object of the invention is to provide improved methods and apparatus for mechanically wrapping articles or containers, whereby the size of the wrapping machine and therefore the space occupied thereby is substantially reduced.

The invention relates more specifically to the wrapping of containers such as cardboard and like cartons which are wrapped within waterproof or moisture-proof material such as transparent waxed paper or paper impregnated with some other moisture-proof material, which may also be rendered adhesive by the application of heat.

One object of the invention is to remove a partially wrapped article or container from retaining and/or wrapper folding means such as a packet wheel in a mechanical wrapping machine, in which the container is pushed out of the said retaining and/or folding means by moving it in the same direction with respect to the retaining means as it was moved on its insertion therein. In this manner the wrapping around the article or container is tightened thereon due to the friction between the outer surface of the wrapper and the retaining and/or folding means.

Another object of the invention is to provide means whereby during subsequent wrapping stages, the article or container is always moved in a direction which is away from overlapping edges of the wrapping material, so that the tightening effect upon the wrapping is maintained.

A further object of the invention is to wrap the article or container in stages, the article or container being moved during or between stages, so that in a wrapping machine, articles or containers may be fed therein at intervals corresponding to the stages of the wrapping.

Another object of the invention is to move the article or container during the stages of wrapping in a defined path, one or more portions of which are stepped in relation to the others. In this manner the length of a machine for wrapping may be reduced considerably, as one or more of the steps may be in the vertical direction.

Yet another object of the invention is to rotate a partially wrapped article or container through 90° during its passage between two stages of the wrapping operation, during which it is transferred from a first folding station to a second folding station, as for example in what is known in the art as a carton or packet wheel. Such a rotation enables the article or container to be moved during the next stage of the wrapping to the next station by movement in the same direction with respect to packet retaining means as it was inserted, and simultaneously permits another article or container to be fed to the first wrapping station.

Another object of the invention is to push the article or container against the sheet of wrapping material on being fed to a wrapping machine, and thereafter between guides to fold the wrapping to channel shape around three sides of the container, from which it is subsequently removed in the same direction with respect to the guides as it was inserted. In the next stage of the wrapping the side parts of the wrapping material which extend beyond the uncovered side of the container are folded over the fourth side before the container is pushed out from the guides. During the removal of the partially wrapped article or container from between the guides, the portions of the wrapping extending beyond the ends of the container are folded over said ends from opposite sides in the direction of movement of the article or container whilst it is being removed. Closure flaps are thus formed at each end of the container in alignment with the guides, and these are subsequently folded over the ends of the package so that one closure flap at each end overlaps the other, and these overlying closure flaps are sealed.

Conveniently the sealing is effected by passing the wrapped article or container between end sealing means such as heated rollers, whereby impregnation in the wrapping at these closure flaps may be rendered adhesive.

The invention also includes an improved wrapping machine and various improved mechanisms therein as will be apparent hereinafter, together with other objects of the invention.

The invention is illustrated by way of example in the accompanying drawings, in which:—

Fig. 1 shows diagrammatically the sequence of operations of a machine according to the invention when viewed from the right hand side, Fig. 2 shows in perspective the various stages of the wrapping undergone by an article or container passing through the wrapping machine, the wrappings being shown at the end of each stage of movement of the article.

Figs. 3, 3A and 3B show the mechanism of an improved wrapping machine according to the invention in side elevation as seen from the right hand side of the machine, Figs. 4 and 4A show in front elevation a packet wheel forming part of the machine shown in Figs. 3, 3A and 3B.

Figure 10:
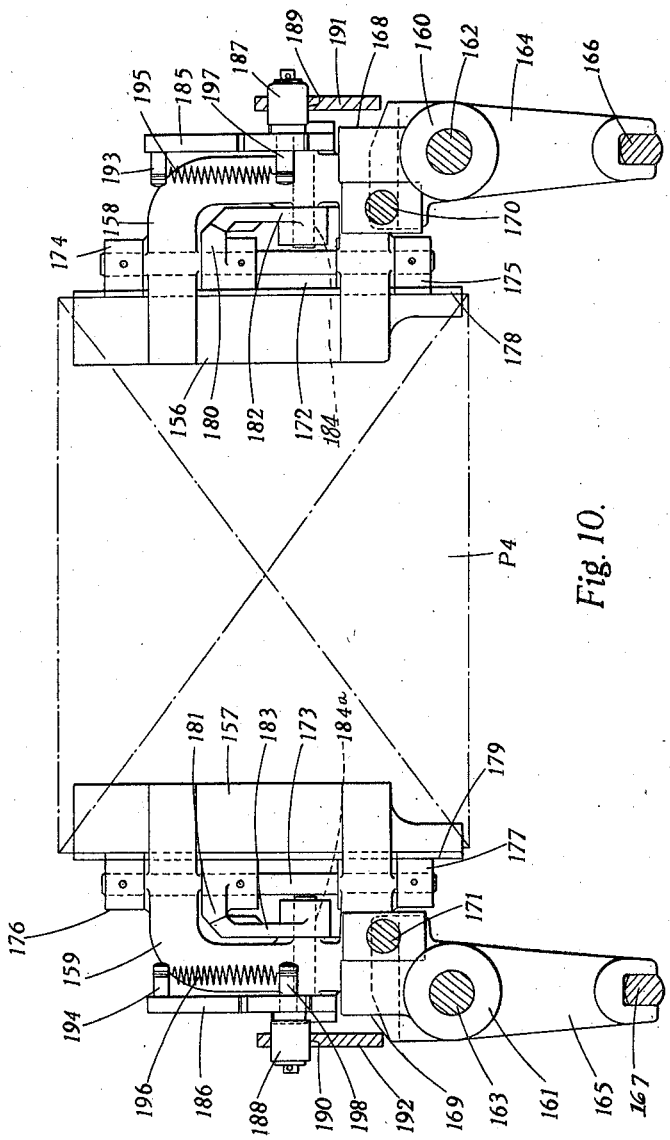
Figure 11:
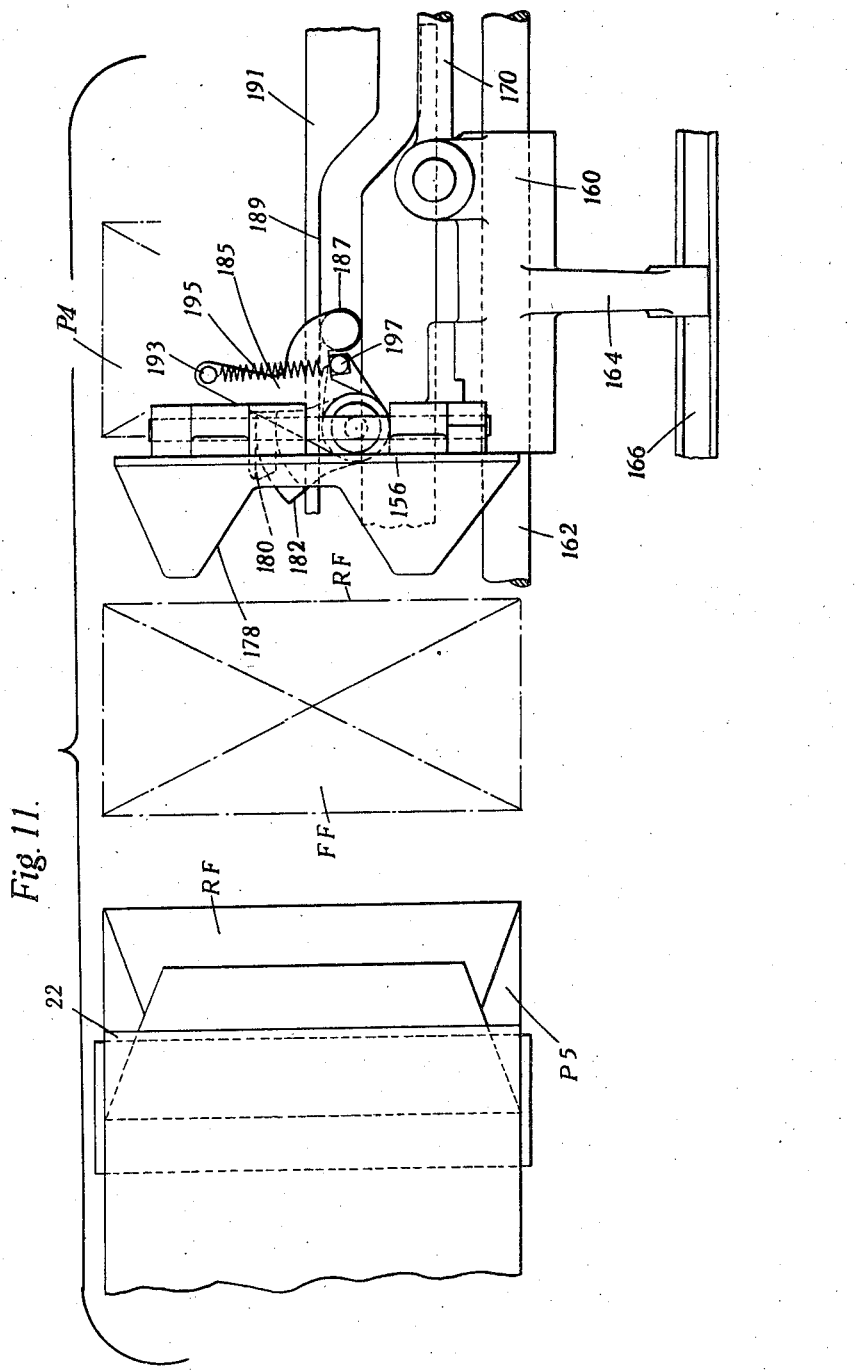
Figure 12:
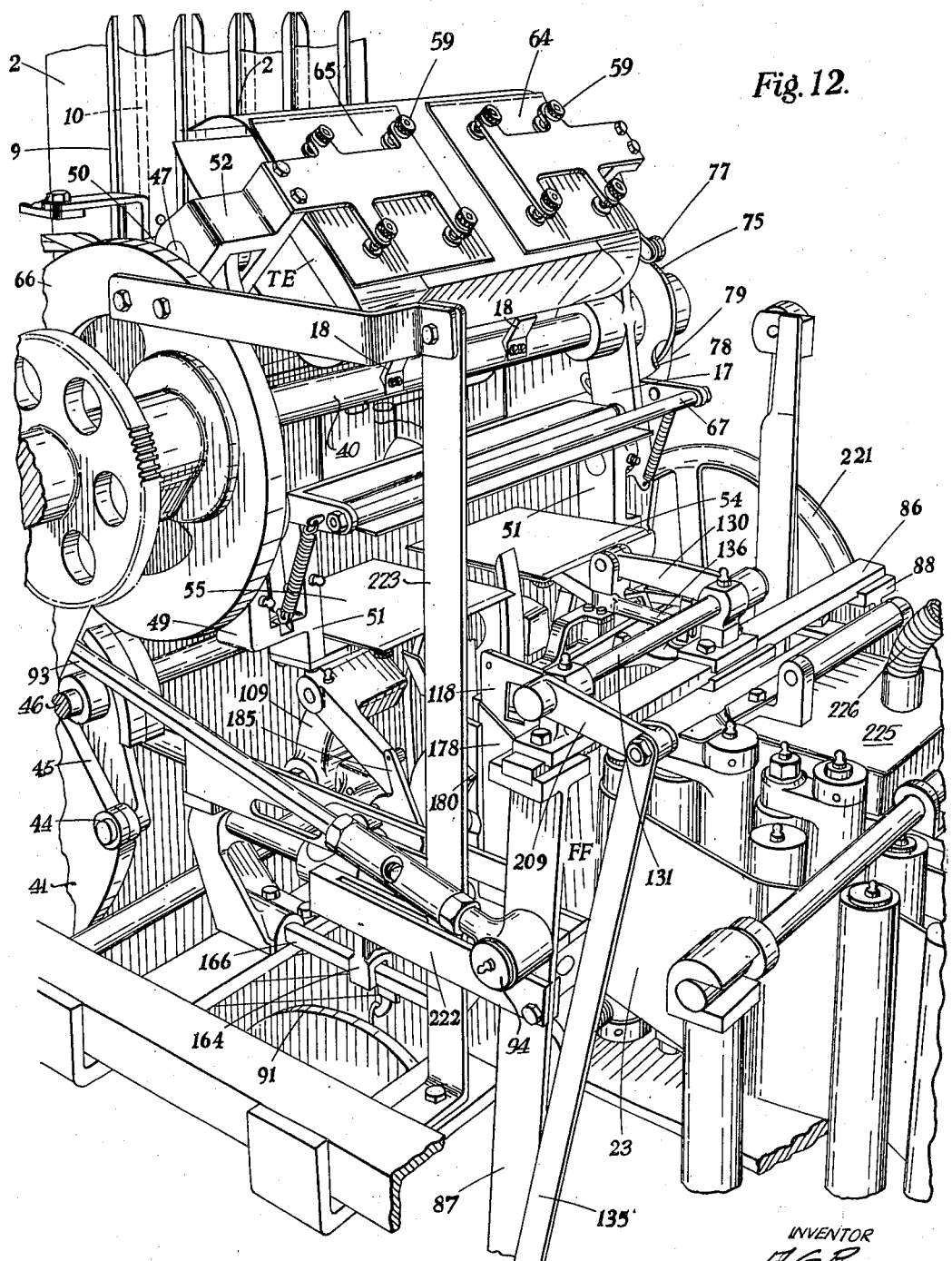

Fig. 5 shows the packet wheel in side elevation as seen from the right hand side of the machine, Fig. 6 shows in side elevation packet removing mechanism and upper and lower end folding mechanisms as seen from the right hand side of the machine, Fig. 7 shows the arrangement shown in Fig. 6 in front elevation, Fig. 8 shows in front elevation upper end folding mechanism at a stage of its operation, Fig. 9 shows in front elevation lower end folding mechanism, Fig. 10 shows in front elevation mechanism for folding end closure flaps and gripping the container, Fig. 11 shows the arrangement illustrated in Fig. 10 in side elevation as seen from the right hand side of the machine, and Fig. 12 is a pictorial view of the part of the machines, viewed from the left hand side, and showing the packet wheel and other mechanisms during a stage of the wrapping.

Similar parts of the machine are denoted throughout the figures by the same numerals, and for convenience of reference, and in order that the passage of the package throughout the machine may be readily followed, the front face of the package has been designated FF, and the rear face, RF. Similarly, the left hand side of the package is designated LS, the right hand side RS, the top end TE and the lower end LE. It will be appreciated that the package being of rectilinear form, may be reversed end for end, and/or front to rear without affecting the operation of the machine.

Referring to the diagrammatic Figure 1, waxed wrapping paper 2 is fed into the machine from a reel 1 by means of a feed wheel 3, which bears against a roller 4 over which the paper passes. The machine is driven continuously, but packages are passed through the machine in a series of six well defined stages, and a length of wrapping paper sufficient to wrap up one packet, is fed into the machine during each of its stage movements, by intermittent rotation of the feed wheel 3. In order to compensate for the uneven feed of the paper, between the feed roller 3 and the reel 1, it passes over a roller 5, which is slidable in guides 6 by the tension in the paper during feeding, against the resistance of a tension spring 7, the paper passing under a jockey wheel 8 before passing between the feed roller 3 and the roller 4.

The wrapping is fed into the machine through sets of vertical guides 9, 10, to the position shown in Figure 1 at 2a. In this position it is held yieldably by the guides, and extends across the opening between a pair of horizontal guides 11 and 12 with its centre in alignment with the point midway between the guides 11 and 12. Simultaneously with the feeding of the wrapping to the position 2a, a package P is fed transversely by means of a horizontal belt 13 to a position as shown at P₁ in Figures 1 and 2, where it subtends the opening between the guides 11 and 12 but on the opposite side of the wrapping. A feed ram 14 is arranged to push the package P in a horizontal direction between the guides 11 and 12, and the wrapping is simultaneously severed by a knife 15, so that it becomes wrapped around the front and rear faces FF and RF and the left hand side LS of the package (as shown at P₂ in Fig. 2) with its side portions extending between the guides 11 and 12, beyond the right hand side RS of the package. The length of the paper in the horizontal direction transversely of the machine is somewhat greater than the height of the package between its top and lower ends TE and LE, to allow sufficient wrapping to be folded over the ends of the package. The guides 11 and 12 extend over the end portions of the wrapping and thus serve to prevent the corners of the wrapping from turning back.

The feed ram 14 is provided at its sides with extension pieces which engages the wrapping at its parts a and b (Fig. 2) in alignment with the left hand side LS of the package, which extend beyond the ends thereof.

The feed ram 14 and its side extension pieces push the package P and the wrapping through the guides 11 and 12, and thereafter between retaining plates 15 and 16 provided on a packet wheel 17. A stop 18 is provided to position the package P correctly between the retaining plates 15 and 16, and the feeding of the packet to its position P1 on the belt 13 and thence to its position P2 between the retaining plates 15 and 16 occupies the period of one stage of movement of the machine.

The packet wheel 17 is provided with two pairs of retaining plates 15, 16 and 19, 20, and makes a half revolution in a counter-clockwise direction during each stage of movement of the machine. During a half revolution of the packet wheel 17, one pair of packet retaining plates is moved from the position shown at 15, 16 to that shown at 19, 20, and the other pair is moved from the position shown at 19, 20 to that shown at 15, 16. During this movement from P2 to P3 however, the packages P and its retaining plates 15, 16 are rotated with respect to the packet wheel clockwise through 90°, so that when the plates reach the position 19, 20, the right hand side RS of the package is uppermost, and the front and rear faces of the package FF and RF are vertical. Immediately before the packet wheel rotates in the counter-clockwise direction, the guides 11 and 12 are swung outwardly to permit free passage of the extending portions of the wrapping.

During the next stage of movement of the machine, the package is moved from its position P3, vertically downwards to a position P4, and during the latter part of this movement, when it has been removed clear of the retaining plates in the position 19, 20, the packet wheel 17 is again rotated half a revolution and the plates are rotated in a counter-clockwise direction to the packet receiving position P2 which was formerly occupied by the other pair of retaining plates. Whilst the packet wheel performs this half revolution in a counter-clockwise direction, the plates which were in the position 19, 20, rotate about their own axis through an angle of 270° in an anti-clockwise direction, so that the vertical plate 19 is returned to the horizontal position occupied at the previous stage by the plate 15.

Immediately before the movement of the package from the position P3 to the position P4, the upwardly extending portions c and d of the wrapping are folded successively over the right hand side RS of the package, and during the movement between the positions P3 and P4, the portions of the wrapping which then extend beyond the top end TE and the lower end LE, in alignment with the right hand side RS and the left hand side LS of the package, are folded inwardly against the top and lower ends of the package respectively such as shown at a and e, P4, Fig. 2, so that when the package arrives at the position P4 two end closure flaps (f in P4) extend beyond the top end and two similar flaps (g and h in P4) extend beyond the lower end of the package in alignment with the front and rear faces of the package.

In folding over the ends of the wrapping between the stage P3 and P4, the upwardly extending part c of the wrapping adjacent the rear face RF of the package is first folded over against the right hand side RS of the package, and thereafter the portion of the wrapping d extending adjacent the front face FF of the package is folded over against the right hand side RS of the package so as to overlap the opposite edge c of the wrapping. The partially wrapped package is then gripped between an upper ejector plate 83 and a lower horizontal platform 21, and is slid vertically downwards from between the retaining plates 19 and 20. During this downward movement of the package, upper and lower folding devices fold the upper and lower extending parts of the wrapping such as e and a over the two ends of TE and LE of the package.

When the package reaches the position P4, a pair of vertically pivoted folding plates fold over the flaps such as h of the wrapping extending in alignment with the rear face RF of the package at either end thereof and thereafter grip the package, and a feed ram 22 then pushes the partially wrapped package from the receiving platform 21 in a horizontal direction to the position P5, in which it is received between a pair of moving belts 22, 23 extending between vertical rollers, whereby the package is moved progressively to the left, the belts serving at the same time to fold over the remaining pair of end closure flaps f and g at each end of the package which are in alignment with the front face FF.

During the passage of the completely wrapped package between the pairs of belts 22, 23 the closure flaps f and g are heated slightly so that the wax in the wrapping is softened and melted slightly. The package then passes between unheated belts or rollers so that the flaps f and g are pressed in towards the package to secure the wrapping. In order to seal the package completely, it also passes under a set of horizontally mounted heating rollers or a belt arranged to bear on the right hand side of the package which is then uppermost, so that the wax at the edges of the overlapping part d of the wrapping along the right hand side of the package is softened and melted slightly and pressure is applied to seal this overlapping part to the layer c underneath.

Referring now to Figure 3 of the drawings, the feed roller 3 for feeding the wrapping 2 is operated from the main drive of the machine, and feeds the wrapping over a cutting block 15a with which the cutting knife 15 cooperates. The knife 15 is mounted on horizontal rocking levers 35 which are arranged one on either side of the machine on vertical spindles 36. One spindle is provided at its lower end with a bevelled gear wheel 37 which is engaged alternatively by toothed quadrants 38 and 39 provided on a member which is rotated continuously from the main drive of the machine, to rotate the spindles 36 partially and move the cutting knife 15 across the paper 2 against the bias of restoring springs, simultaneously with each feeding movement effected by the feed ram 14. The wrapping after passing over the cutting block 15a, passes between two rows of vertical guiding and retaining rods 9 and 10 arranged alternately in front and at the back of the paper. These retaining rods extend to near the uppermost part of the package in its position between P1, P2, and are staggered so that the wrapping is slightly flexed to a vertically corrugated form and is thus held between the rods due to its own rigidity. The lower ends of the rods on the side of the wrapping adjacent the packet wheel 17, are curved towards the packet wheel to prevent tearing of the wrapping when it is withdrawn from the guides and introduced between the retaining plates on the packet wheel by the feeding of a package by the feed ram 14.

The package P is fed into the machine to its first position P1 on the horizontal belt 13 in front of the feed ram 14 which is supported at the end of a carriage 24 furnished at either side of the machine with pairs of rollers 25 and 26 which roll in guides 27 and 28. The carriage 24 is moved forward in the direction of the arrow to push the package P into its second position P2 by means of an arm 29 pivoted at its lower end 30 to a lever 31 which is freely pivoted about an axis 32 in the machine frame. The arm 29 is connected at an intermediate point 210 therein by a connecting rod 33 to one arm 211 of a bell crank lever 211, 217 which is pivoted about the axis 32. On the axis 32 is also pivotally mounted a lever 212 which is provided on one side with a lug 213 which bears against a lug 214 formed in the side of the lever arm 211. At the end of the lever 212 is mounted a roller 215 which bears on the outer surface of a cam 34 which is rotated continuously about an axis 216 from the main drive for the machine, to rock the arm 29 once during each stage of the machine's operation. The movement of the arm 29 is arranged so that the feed ram 14 pushes the package from its position P1 to its position P2 rapidly at the beginning of each stage. At the free end of the arm 217 of the bell crank lever is mounted a roller 218 which bears on the outside of the cam 34, and the levers 217 and 212 are connected together by a tension spring 219.

The return stroke of the lever 29 is thus effected positively by the lever 217 through its connected arm 211, but the forward stroke of the lever 29 is effected by the lever 212 through the resilient connection 219. This ensures that the feed ram 14 is not forced forwardly against any high resistance such as would occur if a packet became jammed in the position P1. In such an event, the cam 34 continues to rotate and the lever 212 is rocked by the cam against the tension of the spring 219 which however is adjusted so as to be sufficient only to permit the feed ram 14 to be moved forward to push a packet against the resistance of the wrapping and into the packet receiving plates on the packet wheel.

In order to prevent the feed ram 14 from operating in the event of a package not being fed into the machine by the belt 13 or being fed so as to position the package wrongly in the machine, a safety catch is provided which engages the feed ram carriage 24 and prevents movement of the feed ram 14 except when the package P1 is correctly positioned.

The packet wheel and its associated mechanism is shown in Figures 4 and 5, and comprises essentially an arm 17 pivoted at its centre on a fixed shaft 40. The arm is geared to a Geneva wheel 41 (shown in Fig. 3) which is provided with five radial slots 42. These slots are engaged successively by rollers 43 and 44 which are carried at the ends of an arm 45 rotated in an anti-clockwise direction continuously from the main drive of the machine about the axis 46 (shown also in Figure 4). The Geneva wheel 41 is thus rotated in a clockwise direction in stages, and has connected to its spindle a gear wheel 41a which meshes with a gear wheel 17a secured to the arm 17 so that the packet wheel rotates through 180° in an anti-clockwise direction for each fifth of a revolution of the Geneva wheel 41.

The arm 17 is provided at each end with a pivot pin 47, 48 respectively, on which are pivotally mounted trailing arms 49 and 50 respectively. These arms are secured to carriers 51, 52 each of which supports a set of parallel packet-receiving plates, a single one 53, 63 and an opposite parallel pair 54, 55 and 64, 65 respectively. When the carrier is in the package-receiving position shown at P2 in Figure 4, the lower plate 53 which is fixed to the carrier 51 is horizontal, with its upper surface in alignment with the upper surface of the belt 13 from which the package is pushed from its position P1 into its position P2. The upper plates 54 and 55 are spaced from the plate 53, a distance slightly less than the width of the packet between its front and rear faces FF and RF, and these plates are yieldably mounted on arms 56 and 57 secured to the carrier 51, so that they can be moved laterally away from the plate 53 against a biassing force. The plates 54 and 55 have each secured to their upper sides four studs 58, which freely protrude through the arms 56 and 57 and are secured with respect thereto by knurled adjustment nuts 59. Compression springs 60 are interposed between the plates 54, 55 and the arms 56 and 57 respectively, to provide the biassing force for the plates 54 and 55.

The arm 52 is similarly provided with a fixed plate 63 and a pair of resiliently mounted upper plates 64 and 65.

In order to produce the rotation of the packet P2 from its horizontal position on entering the packet wheel to its vertical position P3 from which it is removed from the packet wheel vertically downwards, the trailing arms 49 and 50 are provided at their ends with rollers 61 and 62 respectively. These rollers engage in a circular cam track 66 which is eccentrically mounted with respect to the axis 40 of the packet wheel so that as the packet wheel arm 17 is rotated about the axis 40, the trailing arm 49 moves from its position shown in Figure 2 to the position occupied by the trailing arm 50 at the opposite side of the packet wheel. The package is thereby rotated through 90° only during the half revolution of the packet wheel 17 in which it moves from position P2 to P3. The package retaining plates are rotated through 270° in their repositioning movement between the package positions P3 and P2 so that the yieldable plates are always uppermost when in the position P2 and the fixed opposite plate in position P2 is thus always in alignment with the belt 13.

In order to fold over the protruding portion c (Figure 2) of the wrapping which is in alignment with the rear face RF of the package just before it reaches the position P3, each carrier 51 and 52 is provided with a folder rod 67 and 68 respectively, which is arranged to be moved across the rear side RS during the last portion of its movement between the position P2 and P3. The rod (which may have a roller sleeve thereon), is carried at the ends of a pair of cranked levers 69 and 70 which are pivoted one at each end of the carrier 51 on an axis 71. The remote end of the lever 70 carries a roller 72, and the arms 69 and 70 are biassed by tension springs 73 and 74 respectively, so that the roller 72 bears on a fixed cam 75 which is coaxial with the axis 40 of the packet wheel 17.

The folder rod 68 is similarly carried on a pair of arms 76, one of which carries at its other end a roller 77 which bears on the surface of the cam 75. This cam is formed at an appropriate position with an indent 78 so that when the packet wheel 17 reaches the horizontal position in which the left hand packet-retaining plates 63, 64 and 65 (Fig. 4) are vertical, the roller bearing against the cam 75 enters the indent 78 so that it occupies the position shown in Figure 5 by the roller 77. This movement of the roller produces an anti-clockwise rocking of the lever 76, so that the folder rod 68 is moved across the rear side RS of the package, which in this position as shown in Figure 5, is uppermost and horizontal. This movement of the folder rod 68 folds over the protruding portions c (Figure 2) of the wrapping substantially flat against the side RS of the package.

In order to remove the folder rod 68 rapidly from the uppermost side of the package in its position P3, a lever arm 79 which is pivoted in the machine frame at 80 bears at one end against the operating roller for the folder rod 67 or 68 when in the position shown in Figure 5 as occupied by the roller 77. The remote end 79a of the rocker arm 79 supports a roller 81, which bears against a cam 82 continuously rotatable about the axis 46 from the main drive of the machine. The cam 82 is so arranged that after the roller 77 has entered the indent 78 on the cam 75 to fold over the upwardly extending flap c in alignment with the rear face of the package over the rearside RS of the package, and before the package is removed downwardly from between the retaining plates 63, and 64, 65, the arm 79 of the lever is depressed so as to move the roller 77 rapidly away from the indent 78 and thus remove the folder rod 68 away from the package.

During removal of this folder rod, a folder and presser plate 83, shown in Figure 6, is moved from the front side FF of the package obliquely downwardly across the rear side RS which is uppermost in the position P3, to fold over the upwardly extending portion d (Fig. 2) of the wrapping which is in alignment with the front face FF of the package. This folder and presser plate 83 folds the flap d over the opposite flap c, and subsequently bears on the now wrapped right hand side RS of the package which is still uppermost. The lowermost surface of the package in the position P3 (which is the left hand side LS of the package), is now supported upon a platform 84 so that the package is gripped between the folder plate 83 and the platform 84. The folder and presser plate 83 is carried at the end of an arm 85 which protrudes from a member 86 extending across the machine and supported at each end on links 87 and 88 respectively. The links 87 and 88 are connected together at their lower ends by a rod 197 (Fig. 3) which extends across the machine, and they are each provided with a slotted guide bar 222 (Fig. 12) extending along the machine, through which bars pass vertical guide rods 223 secured to the machine frame. The links 87 and 88 are thus constrained to move in planes parallel to the sides of the machine. At its lower end, the link 88 is pivotally connected at 198 with the lever arm 199 of a bell-crank lever which is journalled on a pivot pin 89 secured in the frame of the machine. The other arm 200 of the bell-crank is provided at its free end with a bearing surface 201 which contacts with a lug 115 projecting from an operating lever 116 pivoted about the pin 89. The lever arm 90 of a bell-crank lever 90, 202, which is also pivotally mounted on the pin 89, is connected to the lever 116 by a tension spring 203. The short lever arm 202 of the bell-crank lever is formed with a bearing pad 203 which bears on the underside of a lug 204 projecting outwardly from the lever 199.

The free ends of the lever 90 and 116 are provided with rollers 205 and 206 respectively, which bear on the outsides of cams 91 and 91a respectively, which are rotated about the axis 92 from the main drive of the machine. When this cam operates to lift the roller 206, the lever 199 and thus also the upper folding mechanism for the packet, is raised through the resilient connections of the spring 203 with the lever 90 and the contact between the pad 203 and the lug 204. Thus if a packet becomes jammed in the machine in the path of the upper folding mechanism, the links 88 and 89 are not forced upwards, but the lever 116 is rocked against the increasing tension of the spring 203.

Similarly, when the cam 91 operates to depress the roller 205, and thus lower the upper folding mechanism for the packet after it has been gripped in position P3 between the folder plate 83 and the platform 21, to be moved to position P4, the connections between the lever 90 and the lever 199 is again resilient, established through the tension spring 203, the lever 116 and the arm 200 by the bell-crank lever, through the lug 115 and the bearing surface 201. Thus if a package becomes jammed in the packet wheel, the lever 90 is rocked against the tension of the spring 203, and the folder plate 83 is not moved to crush the package. The lever arms 87 and 88 have pivoted thereto at 94, links 93, which are pivoted at their other ends, at the ends of levers 95 freely pivoted about the pivot 32. This link arrangement ensures that the transversely extending member 85 moves downwardly in a vertical path from the position shown in Figure 6, and returns to its upper operative position by a circuitous path whereby the folder and plate 83 is slid horizontally off the package at the lowermost position of the lever 87, and is slid on to the package with a substantially downwardly inclined movement at the uppermost position. The arm 85 supporting the pressure plate passes between the two resiliently applied packet-retaining plates 54 and 55 or 64 and 65 during its downward movement.

The packet-supporting platform 84 (Figs. 6, 7 and 9) is carried resiliently upon a supporting carrier 96 which is mounted at the upper end of a vertical rod 97. The platform 84 is provided with studs 98 which protrude freely through vertical holes in the carrier 96, compression springs 99 being inserted between the platform 84 and the carrier. The upward movement of the platform plate 84 with respect to the carrier 96 is limited by pins 100 passing through the studs 98.

The rod 97 is slidably mounted in a vertical guide 101 (Fig. 3) which is carried at the end of a bracket 102 secured to the frame. The bracket 102 is provided with an arcuate slot 104 in an extension 105 thereof. A link 106 pivoted at 107 in the platform supporting rod 97, is pivotally connected at its other end 108 to a swinging link 109 pivoted about an axis 103 in the frame. In its intermediate portion, the link 106 carries a roller 110 which slides within the arcuate slot 104. Pivotally connected to link 106 at 111 is a connecting rod 112 which is pivoted at its other end 113 to a driving crank arm 114 which is pivoted at its other end about the axis 89 and is actuated from the main drive of the machine in a manner similar to the driving crank arm 199, to lower the platform 96 when the package is to be removed from the position P3 to P4. This movement is vertical downwards during the movement of the package, and at the end of this vertical movement, the platform remains stationary whilst the package is removed therefrom to the next position P5, whereafter the platform is again raised vertically to the packet receiving positions P4, one complete reciprocating movement of the platforms occupying a period of one stage of the machine movement.

During the passage of the package from the position P3 to position P4, the upper and lower portions e and a of the wrapping extending beyond each end of the package are folded downwardly and upwardly respectively as shown in Figure 2. The downward folding of the upper portion e is effected by mechanism associated with the upper pressure plate 83, and the mechanism for folding up the lower portions a of the wrapping is associated with the lower platform 84.

The upper folding mechanism for folding down the flaps e is shown at the end of the folding operation in Figures 6 and 7 and during the folding operation in Figure 8. The mechanism comprises a pair of folder plates 117 and 118 disposed one at each end of the folder and presser plate 83. The folder plate 117 is carried at the end of an arm 119, which is slotted intermediately at 206, through which slot passes a pin 120 carried in a vertical sleeve member 121. The other end of the lever 119 is slotted as shown at 122 and this slot is engaged by a transversely extending pin 123. The plate 118 is similarly supported by a lever 123 which is slotted at 207 with a pin 124 on the sleeve 121 engaging the slot and also slotted at its other end 125, this slot being engaged by a pin 126. The pins 123 and 126 are supported in lugs 127, 128 respectively which are carried on the top presser plate 83. This plate also carries a vertical pin 129 upon which the sleeve 121 is slidably mounted. Vertically downward movement of the sleeve 121 thus produces rotation of the arms 119 and 123 about their pivots 120 and 124 respectively, and simultaneously the folder plates 117 and 118 are brought into the folding positions shown in Figure 7.

The vertical movement of the sleeve 121 is effected by a lever 130 (Figures 3 and 6) which is carried by a spindle 131, pivotally mounted on a pair of short columns 132, 208 carried on the transversely extending member 86. The end of the lever 130 is pivotally connected at 133 to the upper end of the sleeve 121. At the outer end of the spindle 131 is secured an arm 209, the end of which is pivotally connected at 134 to a connecting link 135 which is raised with respect to the support 87, after the upper presser plate 83 has been moved over the uppermost side of the package to fold over the flap c and grip the package between itself and the platform 84. In order to ensure the correct alignment of the upper operating mechanism the sleeve 121 is provided with a rearwardly extending spur 136 which is slotted at its end to engage a guide rod 137 projecting vertically upwards from the presser plate supporting arm 85.

The connecting link 135 is pivoted at its lower end to a bell-crank lever 138 (Figure 3) which is pivoted in the link 88 at 139. The other arm 140 of the bell-crank lever is provided with a roller 141 which engages the surface of a cam 142 as the link 88 descends, and causes the necessary upward movement of the link 135.

The lower folding mechanism associated with the platform 84 for folding up the flaps a, is shown in the folded position in Figures 6 and 7, and in the free position in Figure 9, and comprises a pair of folder plates 143, 144, which are carried on arms 145 and 146 respectively. The arm 145 is pivoted at 246 on a bracket 147 projecting from the platform carrier 96, and the lever 146 is pivoted at 148 on a bracket 149 projecting from the platform carrier 96 at the opposite end thereof. The levers 145 and 146 each carry rollers 150 and 151 respectively at their ends and these rollers engage vertical cam surfaces 152 and 153 respectively. The rollers are held in resilient contact with the cam surface by means of tension springs 154 and 155 respectively which are connected respectively between the arms 145, 146 and the platform carrier 96. The cam surfaces 152 and 153 are so shaped that as the platform carrier 96 descends in its vertical path the folder plates 144 are moved from their position shown in Figure 9 to that shown in Fig. 7.

When the platform 84 reaches its lowermost position after folding the folder plates 143 and 144 are swung away from the package due to the cams 152, 153, and the package is now in the position P4 as shown in Figures 10 and 11 in which it is completely wrapped with the exception of two pairs of parallel closure flaps one pair, f and g (Figure 2) extending beyond each end of the package in alignment with the front face FF, and the other, only one h of which is shown in Figure 2, extending in alignment with the rear face RF of the package.

Whilst the package is in this position, the two closure flaps such as h, which are in alignment with the rear face RF of the package are folded over against the ends of the package by folding mechanism shown in Figures 10 and 11, and whilst these flaps are retained in their folded positions, the package is fed horizontally between a pair of parallel belts extending between vertical rollers, and spaced apart a distance equal to the length of the package.

The folding mechanism for the end closure flaps h which are in alignment with the rear faces of the package, is carried on a feed ram which moves in a horizontal direction to feed the package between the rotating belts, and the folding of the end flaps is performed during the passage of the package from its position P4 to its position P5, as shown in Figure 11, this passage occupying the period of one stage of the operation of the machine.

The feed ram comprises a pair of plates 156, 157 arranged one at either end of the package, as shown in Figure 10. These plates are supported on arms 158 and 159 respectively, which are in turn supported on carriages 160, 161. The carriages are slidable on horizontal rods 162, 163, which are secured one on either side of the machine frame, and in order to prevent rotation of the carriages on the guide shafts 162, 163, the carriages are each provided with downwardly depending forked lugs 164, 165, the lower forked ends of which engage guiding shafts 166, 167 respectively. Each carriage is provided with a lug 168, 169 whereby it is pivotally connected to a connecting rod 170 and 171. These connecting rods are operated from the main drive of the machine through lever 220 operated by a cam 224 so as to move the carriages 160 and 161 forwardly when the platform 84 has reached the position in which the package is in its position P4.

The arms 158 and 159 on the carriages are formed with bosses through which pass vertical spindles 172 and 173 respectively. The protruding ends of these spindles are secured to bosses 174, 175, and 176, 177 which are attached respectively to folder plates 178 and 179, shaped as shown in Figure 11.

Secured also to the spindles 172 and 173 are toothed bevelled quadrants 180 and 181, and these are meshed respectively by toothed bevelled quadrant racks 182 and 184, which are secured respectively on spindles 183a and 184 journaled in the lower parts of the arms 158 and 159 respectively and protruding to the exterior thereof. On the outer ends of these spindles 183 and 184 are secured bell-crank levers 185 and 186 respectively. At the end of one arm of each bell-crank lever is a roller 187 and 188, and these rollers engage cranked horizontal slots 189 and 190 in horizontal guide members 191 and 192 which are fixed to the side of the machine frame. At the ends of the other arms of the bell-crank levers are provided pins 193 and 194 whereby the bell-crank levers are biassed by tension springs 195 and 196, the other ends of the springs being anchored to pins 197 and 198 secured in the arms 158 and 159.

When the feed plunger is in its withdrawn position, the rollers 187 and 188 are within the lower horizontal portion of the slots 189 and 190, and the folder plates 178 and 179 are thus directed outwardly. As the feed plates 156 and 157 are moved forwardly by the connecting rods 170 and 171, the rollers 187 and 188 reach the cranked portions of the guide slots 189 and 190, and in consequence the bell-crank levers 185 and 186 are rotated against the bias of the springs 195 and 196. This rotation produces through the toothed quadrants 182, 183 and 180, 181 rotation of the folder plates 178 and 179 about the spindles 172, 173 to the positions shown in Figures 10 and 11 where they are parallel to the ends of the package. The closure flaps of the wrapping such as h, which are in alignment with the rear face of the package are thus folded over the ends of the package, and the package is gripped between the folder plates to be fed forward by the feeding plates 156 and 157 to the final closure and delivery belts.

When the package is gripped between these belts, the carriages 160 and 161 are withdrawn by their connecting links 170 and 171, and positioned to receive the next package. In this withdrawal movement, the rollers 187 and 188 encounter the cranked portions of the guide slots 189 and 190 and the folder plates 178 and 179 are thereby swung outwardly again.

When the package is received between delivery belts 22, the two remaining end closure flaps f and g (Fig. 2), in alignment with the front face FF of the package are folded over their opposite end closure flaps h, so as to overlap these, and as the package passes between the belts, these end closure flaps are subjected to slight heating by heated rollers so that the wax in the paper in these parts softens and partially melts. During further passage of the completely wrapped package between the belts, pressure is applied endwise on the package so as to seal these end closure flaps on cooling and solidifying of the wax.

In order to seal the over-lapping edge d of the wrapping of the right hand side RS of the package which is now uppermost, a set of rollers on horizontal axes are arranged above the package in a casing 225 (Fig. 12), located between the belts 23 so that the rollers bear on the side RS. The first rollers to be encountered by the package are heated slightly by means of electric resistances, connections to which pass into the casing 225 through a conduit 226. This heating causes softening and partial melting of the wax in the paper, and as the package passes beneath the subsequent rollers, the under surface of the overlapping edge portion of the flap d of the wrapping on this side of the package is effectively sealed to the upper surface of the part c of the wrapping underneath.

The sealed packages may then be delivered by the machine by any suitable ejecting mechanism such as a travelling belt, and in order that the packages in the machine shall be delivered therefrom, even if the machine is stopped, the sealing and delivery belts are driven from a source of power separate from the main drive of the machine.

In order to rotate the machine slowly so that a new length of wrapping may be introduced into the machine when a reel I is exhausted, a hand wheel 221 (Fig. 12) is mounted on a spindle which may be connected to the main drive of the machine by a clutch.

The machine as described, operates in stages and during each stage a fresh package is introduced into the machine from the belt 13 so that there are always five packages simultaneously in the machine undergoing the various folding operations when the machine is operating. The progressive movement of the package between each stage enables a continuous feed of packages into the machine and thus the output of the machine may be made as high as desired. Usually however it will be found that a speed of about 60 packages per minute is sufficient for packages of the order of ten to twelve inches in length.

Furthermore, in their movement between successive stages, the packages are always moved against the previous folding movement so that the wrapping is effectively tightened on to the package during each stage. This effect is of particular importance in the early stages of the wrapping, and due to the arrangement of the packet wheel whereby the package is only rotated through 90° between stages P2 and P3, the package is removed downwardly to position P4 by pushing it through the retaining plates 19, 20 (Figure 2) against the wrapping over the left hand side LS of the package. This has the effect of tightening the wrapping about the front and rear faces FF and RF of the package and also the left hand side LS.

Moreover, due to the arrangement of the packet wheel and the final horizontal feed of the package to the delivery belts, the path of the package through the machine is stepped. This has the considerable advantage of enabling the overall size of the machine to be kept at a minimum so that manufacturing costs of the machine are minimized as also is floor space occupied by the machine.

It will be evident that the construction, arrangement and operation of the machine or parts thereof hereinbefore described by way of example may be modified within the scope of the invention.

I claim:

1. In a wrapping machine having a movable support including retaining means for an article to be wrapped and means including said retaining means for partially wrapping the article, the combination of means for moving the support whereby to actuate said retaining means to another wrapping station, means operative during such movement for rotating the retaining means through an angle, and means at said other station for pushing the partially wrapped article through the retaining means in the same direction relatively thereto as it was inserted therein.

2. In a wrapping machine having a movable support including retaining means for an article to be wrapped and means including said retaining means for partially wrapping the article, the combination of means for moving the support whereby to actuate said retaining means to another wrapping station, means operative during such movement for rotating the retaining means through 90°, and means at said other station for pushing the partially wrapped article through the retaining means in the same direction relatively thereto as it was inserted therein.

3. A wrapping machine comprising means for retaining a partially wrapped article, means for moving said retaining means to another station and for rotating said retaining means throughout an angle during such movement, means at said station for effecting another wrapping operation, means for removing the still partially wrapped article from the retaining means, said last-named means being operative to move the article from the retaining means in the same direction relatively thereto as it was inserted therein, and means operative upon such removal to effect the final wrapping operations.

4. A wrapping machine comprising means for retaining a partially wrapped article, means for moving said retaining means to another station, means operative during such movement for rotating the retaining means through 90°, means at said station for effecting another wrapping operation, means for removing the still partially wrapped article from the retaining means, said last-named means being operative to move the article from the retaining means in the same direction relatively thereto as it was inserted therein, and means operative upon such removal to effect the final wrapping operations.

5. A wrapping machine comprising means for pushing a carton against a sheet of wrapping material and thereafter into retaining means operative to fold the wrapping material to channel-shape about three sides of the carton, means for moving the retaining means with the partially wrapped carton therein to a subsequent wrapping station, means operative during such movement for rotating said retaining means throughout an angle, means at said station for folding the portions of the side parts of the wrapping which extend beyond the uncovered fourth side of the carton over said fourth side, and means for removing the partially wrapped carton and its wrapping from said retaining means, said last-named means being operative to push the partially wrapped carton and its wrapping through said retaining means in the same direction relatively thereto as they were inserted therein.

6. A wrapping machine comprising means for moving the carton into retaining means across which extends a sheet of wrapping material, whereby the wrapping is folded over two side edges of the carton and wrapped around three sides thereof, means for moving said retaining means and the partially wrapped carton therein to another station and for rotating said retaining means throughout an angle during such movement, means at said station for folding the two side portions of the wrapping extending beyond the uncovered fourth side of the carton over the longitudinal edges of said fourth side, means for removing the partially wrapped carton from said retaining means, said last means being operative to engage against the last covered side of the carton and to push the partially wrapped carton and its wrapper through the retaining means, and means operative upon such removal to fold the opposite projecting end portions of the wrapping over the ends of the carton to form pairs of end closure flaps and finally to close said closure flaps against the carton.

7. In a wrapping machine, a rotatable turret, means for rotating said turret intermittently in the same direction through half revolutions, a pocket rotatably mounted on said turret and means for rotating said pocket through only one quarter of a revolution during each first half revolution of the turret and through the remaining three quarter of a revolution during each last half revolution of the turret.

8. In a wrapping machine, a rotatable turret, pocket means rotatably mounted thereon, a trailing arm on said pocket means and a cam engaged by said trailing arms for controlling the rotation of said pocket means relatively to said turret during rotation of said turret.

9. In a wrapping machine, a rotatable turret, pocket means rotatably mounted thereon, a trailing arm on said pocket means, a circular cam track eccentric of said turret and a roller on said trailing arm, engaging said cam track.

10. In a wrapping machine, a rotatable turret, means for rotating said turret in half revolutions, pocket means rotatably mounted on said turret, a trailing arm on said pocket means, a roller on said arm and a circular cam track engaged by said roller and arranged eccentric of said turret.

11. In a wrapping machine, a rotatable turret, a pair of packet retaining pockets rotatably mounted diametrally on said turret, a trailing arm on each pocket, a roller on each arm, a circular cam track engaged by said rollers and arranged eccentric of said turret, a station at which one pocket is horizontal, a diametrally opposite station at which the other pocket is vertical and means for rotating said turret intermittently in the same direction to interchange the positions of said pockets.

12. Packet wheel for transferring a partially wrapped carton from one wrapping station in a wrapping machine to another, comprising a rotatable carrier member, carton receiving and retaining means rotatably mounted on said carrier member, means for moving the carrier after receipt of a partially wrapped carton to a second station, means for rotating the carton receiving and retaining means relative to the carrier member during such rotation of the carrier member, and means at said second station for removing said carton from the receiving and retaining means in the same direction relatively thereto as it was inserted therein.

13. Packet wheel for a wrapping machine for transferring a partially wrapped carton from one wrapping station to another, comprising a rotatable carrier member, carton receiving and retaining means rotatably mounted at the free end of said carrier member, means for rotating the carrier to position the carton at the second station, means for rotating the carton receiving and retaining means relatively to the carrier member during rotation of the carrier and means at said second station for removing said carton from the receiving and retaining means in the same direction relatively thereto as it was inserted therein.

14. Packet wheel for a wrapping machine for transferring a partially wrapped carton from one wrapping station to another, comprising an intermediately pivoted carrier member, carton receiving and retaining means rotatably mounted at each free end thereof, means for rotating the carrier intermittently through half revolutions, and means for rotating the carton receiving and retaining means at each end through 90° during transference from the first wrapping station to the second, and through 270° during repositioning from the second station to the first.

15. Wrapping machine including a packet wheel, means for introducing a partially wrapped article into retaining means on said packet wheel, means for rotating said packet wheel through half a revolution to position the article at another station, means for rotating the retaining means through 90° only during said half revolution of the packet wheel, and means for removing the partially wrapped article from the packet wheel in the same direction with respect to the retaining means as it was inserted therein.

16. Machine for mechanically wrapping cartons, including guide means providing a first folding station, means for supporting a sheet of wrapping material across the ends thereof, means for introducing a carton into said guide means so as to fold said sheet of wrapping over three sides of the carton, means for moving said guide means and said carton to a second folding station, means for successively folding the extending side portions of the wrapping over the fourth side of the carton during such movement, means for removing the partially wrapped carton from the guide means at the second folding station in the same direction relatively thereto as it was inserted therein, means for folding over oppositely extending end portions of the wrapping at each end of the container, means for folding over one each of the two pairs of end closure flaps thus formed, and means for folding over the other two end closure flaps.

17. Machine for mechanically wrapping cartons, comprising rotatable carrier means, wrapper folding and carton retaining means rotatably mounted thereon, means for supporting a sheet of wrapping material across the ends of said folding and retaining means when in a horizontal carton receiving position, means for introducing a carton into said folding and retaining means when in the carton receiving position so as to fold the sheet of wrapping over three sides of the carton, means for rotating said carrier means through half a revolution, means for controlling the rotation of the folding and retaining means during said half revolution of the carrier means so that they rotate through 90° only and thereafter locate the carton at a fresh wrapping station with its uncovered fourth side uppermost, means for successively folding over the extending side portions of the wrapping so that one overlaps the other on the said fourth side of the carton, means for removing the partially wrapped carton from the folding and retaining means in a vertically downward direction, means for folding over oppositely extending end portions of the wrapping at each end of the carton, means for folding over one each of the two pairs of end closure flaps thus formed, means for folding over the other two end closure flaps so that they overlap their corresponding flaps, and means for securing the same.

18. Machine for mechanically wrapping cartons comprising the combination of means for supplying intermittently a sheet of wrapping paper to supporting means therefor, rotatable carrier means, wrapper folding and carton retaining means rotatably mounted on said carrier means and adapted to be positioned adjacent the sheet of wrapping material in the supporting means, means for introducing the carton in the said folding and retaining means so as to fold the sheet of wrapping over three sides of the carton within the folding and retaining means, means for rotating said carrier means intermittently through half revolutions to position partially wrapped cartons at a new wrapping station, means for controlling the carton retaining means during each half a revolution of the packet wheel so that they rotate through 90° only during the first half revolution and thereafter locate the carton at the fresh wrapping station with its uncovered fourth side uppermost and through 270° during the last half revolution of the carrier, means for successively folding over the extending side parts of the wrapping so that one overlaps the other on the said fourth side of the carton, means for removing the partially wrapped carton from the retaining means at the fresh wrapping station, means associated with said removing means for folding over oppositely extending end portions of the wrapping at each end of the carton, means for folding over one each of the two pairs of end closure flaps thus formed and thereafter gripping the carton and moving it to the next wrapping station, means for folding over the other two end closure flaps so that they overlap their corresponding flaps, and means for securing the same.

19. In a machine for mechanically wrapping cartons, comprising the combination of means for supplying intermittently a sheet of wrapping material to vertical guiding and supporting means therefor, a packet wheel rotatable intermittently in the same direction through half revolutions, a carton receiving pocket rotatably mounted on said packet wheel, a feed plunger for feeding a carton into said pocket when in a horizontal position adjacent the sheet of wrapping, means for limiting the rotation of said pocket to 90° only, during half a revolution of the packet wheel from its initial position, wrapper folding means associated with said pocket, means for gripping and removing the partially wrapped carton from the pocket after said half revolution of the packet wheel, including a lower platform equipped with end folding means and an upper folding and presser plate equipped with end folding means, means for simultaneously lowering the lower platform and the presser plate to remove the partially wrapped carton from the pocket and also operate the end folding means, end closure flap folding means for folding over two end closure flaps and thereafter gripping said package, means for actuating said gripping means to move a partially wrapped carton horizontally from between the platform and the presser plate, belts for receiving the carton and for folding over the remaining end closure flaps so that they overlap their corresponding flaps, and sealing means for securing them.

20. In a machine for mechanically wrapping cartons, comprising the combination of guiding and supporting means for maintaining a cut sheet of wax-impregnated wrapping material in a vertical plane, an intermediately pivoted arm, a pair of wrapper folding and carton retaining sets of plates pivotally mounted one at each end of the pivoted arm, a Geneva-wheel mechanism for rotating said arm intermittently in the same direction through half revolutions, cam operated trailing arms on each set of said folding and retaining plates to coact with said Geneva-wheel mechanism and position one of said sets of wrapper folding and carton retaining plates at the end of each half revolution alternately horizontally adjacent the supported sheet of wrapping and vertically at a station remote from said sheet of wrapping (and the other set of wrapper folding and carton retaining plates alternately vertically at the remote station and horizontally adjacent the supported sheet of wrapping), means for feeding cartons into the machine in alignment with said wrapper folding and carton retaining plates when in the horizontal position but on the side of the sheet of wrapping remote therefrom, a feed plunger for inserting said cartons alternately into the two sets of folding and retaining plates when in said horizontal position to fold a sheet of wrapping over three sides of each carton within the said folding and retaining plates, an upper folder plate, means for moving said folder plate across the upper side of the carton when in the vertical position to fold over an extending side portion of the wrapping to overlap the opposite side thereof, a lower platform, means for moving said lower platform into engagement with the lower side of the carton when in the vertical position, means for gripping said carton between the upper folder plate and the lower platform and removing it vertically downwards from the set of folding and retaining plates.

21. In a machine for mechanically wrapping cartons, the sub-combination of means for removing a partially wrapped carton from folding and retaining means, comprising an upper folder and gripping plate, and a lower folder platform, a pair of upper and folding fingers horizontally pivoted on said upper folder plate, a pair of lower end folding fingers horizontally pivoted on said platform, cam means for operating each of said pairs of folding fingers during the removal of the carton from the folding and retaining means, a feed plunger for removing the carton from between said upper folder plate and said lower platform, end closure flap folding plates vertically pivoted on said feed plunger, operating means for said feed plunger, cam means for said flap folding plates to rotate said plates during actuation of said feed plunger to fold over two end closure flaps of the wrapping and thereafter grip said carton prior to removal from between said upper folder plate and said lower platform, two spaced rows of vertically mounted rollers, belts extending over said rollers and spaced to receive said carton and to fold over the remaining end closure flaps to overlap the other end closure flaps, heating means associated with said rollers to seal the pairs of end closure flaps together at each end, horizontally mounted rollers to bear on the upper side of the carton, heating means associated with said rollers to seal the overlapping edge portions of the wrapping, and discharge means for delivering the wrapped and sealed cartons from the machine.

ALFRED GERMAN ROSE.